United States Patent
Chen et al.

(10) Patent No.: US 9,516,669 B2
(45) Date of Patent: Dec. 6, 2016

(54) METHOD AND DEVICE FOR DOWNLINK DATA TRANSMISSION

(71) Applicant: CHINA ACADEMY OF TELECOMMUNICATIONS TECHNOLOGY, Beijing (CN)

(72) Inventors: Dong Chen, Beijing (CN); Ying Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/397,642

(22) PCT Filed: Mar. 25, 2013

(86) PCT No.: PCT/CN2013/073128
§ 371 (c)(1),
(2) Date: Oct. 28, 2014

(87) PCT Pub. No.: WO2013/159620
PCT Pub. Date: Oct. 31, 2013

(65) Prior Publication Data
US 2015/0103768 A1   Apr. 16, 2015

(30) Foreign Application Priority Data

Apr. 28, 2012   (CN) .......................... 2012 1 0133375
Sep. 26, 2012   (CN) .......................... 2012 1 0364556

(51) Int. Cl.
*H04W 72/12*   (2009.01)
*H04W 68/02*   (2009.01)

(52) U.S. Cl.
CPC ....... *H04W 72/1273* (2013.01); *H04W 68/025* (2013.01); *H04W 72/1278* (2013.01); *H04W 72/1289* (2013.01)

(58) Field of Classification Search
None
See application file for complete search history.

(56) References Cited

U.S. PATENT DOCUMENTS

2002/0077087 A1* 6/2002 Li .................... H04L 12/189
455/414.1
2009/0221284 A1* 9/2009 Kim ................. H04W 68/025
455/426.1

(Continued)

FOREIGN PATENT DOCUMENTS

CN   101060713 A   10/2007
CN   101400026 A    4/2009

(Continued)

OTHER PUBLICATIONS

Office Action for corresponding Chinese Patent Application No. 201210364556.X, 8 pp., (Sep. 25, 2015).

(Continued)

*Primary Examiner* — Hong Cho
(74) *Attorney, Agent, or Firm* — Blakely, Sokoloff, Taylor & Zafman LLP

(57) ABSTRACT

The present invention relates to the technical field of communications. Disclosed are a method and device for downlink data transmission for use in reducing network resource wastage when a network side is transmitting data to a certain group of user terminals, thus increasing network resource utilization rate. The method comprises: grouping specific user terminals into a group, and identifying each group with a unique Group ID; a user terminal, when idle, monitors paging messages intended for it, and a first message; when a network side is transmitting downlink data, the network side transmits downlink data transmission scheduling information, and pages the group of user terminals at a timing of the group by means of the first message carrying the Group ID of the group; the user terminals that have received the first message receive the downlink data at a time window and a fixed physical resource position on the basis of the group-based downlink data transmission scheduling information received. This reduces waste of network resources in M2M communications when the network side is transmitting data to a certain group of user terminals, thus increasing the effect of network resource utilization rates.

15 Claims, 10 Drawing Sheets

(56) References Cited

U.S. PATENT DOCUMENTS

2010/0081454 A1* 4/2010 Wang .................... H04W 68/02
455/456.1
2010/0278121 A1* 11/2010 Chun .................... H04L 1/1887
370/329

FOREIGN PATENT DOCUMENTS

| CN | 101489305 A | 7/2009 |
| CN | 102158959 A | 8/2011 |
| WO | WO 2009/035282 A2 | 3/2009 |
| WO | WO 2011/084031 A2 | 7/2011 |
| WO | WO 2011/084031 A3 | 7/2011 |

OTHER PUBLICATIONS

PCT International Search Report for PCT Counterpart Application No. PCT/CN2013/073128, 5 pages, (Jul. 4, 2013).
European Patent Office Communication enclosing Extended European Search Report for corresponding European Patent Application No. 13781566.8, 5 pp., (Oct. 5, 2015).
PCT Written Opinion of the International Searching Authority for counterpart PCT Application No. PCT/CN2013/073128, 15 pp. (including English translation), (Jul. 4, 2013).
PCT Notification Concerning Transmittal of International Preliminary Report on Patentability (Chapter I of the Patent Cooperation Treaty) for counterpart PCT Application No. PCT/CN2013/073128, 18 pp. (including English translation), (Nov. 6, 2014).

* cited by examiner

METHOD AND DEVICE FOR DOWNLINK DATA TRANSMISSION

CROSS-REFERENCE TO RELATED APPLICATIONS

This patent application is a U.S. National Stage Application under 35 U.S.C. §371 of International Application No. PCT/CN2013/073128, filed on Mar. 25, 2013, designating the United States, and claiming priority from Chinese Patent Application No. 201210133375.6, filed with the Chinese Patent Office on Apr. 28, 2012, and entitled "Method and device for downlink data transmission"; and this application further claims priority from Chinese Patent Application No. 201210364556.X, filed with the Chinese Patent Office on Sep. 26, 2012, and entitled "Method and device for downlink data transmission", both of which were incorporated by reference in their entireties.

This application claims priority from Chinese Patent Application No. 201210133375.6, filed with the Chinese Patent Office on Apr. 28, 2012 and entitled "Method and device for downlink data transmission"; and this application further claims priority from Chinese Patent Application No. 201210364556.X, filed with the Chinese Patent Office on Sep. 26, 2012 and entitled "Method and device for downlink data transmission", both of which are hereby incorporated by reference in their entireties.

FIELD OF THE INVENTION

The invention relates to the technical field of communications, and in particular to a method and device for downlink data transmission.

BACKGROUND OF THE INVENTION

In recent years, with the continuous development of communication technologies, the traditional Human to Human (H2H) communication and exchange becomes more convenient, and the Machine to Machine (M2M) connection and dialogue also gradually becomes the mainstream of communication development.

M2M communication refers to the communication between machines. Being different from the traditional H2H communication, M2M can automatically complete collection, processing and transmission of data without manual intervention. One important characteristic of the M2M communication is a relatively large number of user equipments, and the number of the user equipments in Machine Type Communication (MTC) is far larger than that of the user equipments in the H2H communication, which is generally several tens of times of that of the user equipments in the H2H communication.

The M2M mode has been applied to many fields, such as water meter statistics, electric meter statistics, gas meter statistics, hydrological monitoring and the like, where these user equipments belong to a same user, for example, electric meters belong to a same power company, water meters belong to a same tap water company, etc., or these user equipments are relatively densely distributed in a region, such as hydrological monitoring. When the user needs to send common information to a certain user equipment belonging to the user or certain user equipments belonging to the user in the certain region, if each user equipment belonging to the user is paged or the information with same content is sent to each user equipment belonging to the user, the waste of network resources is caused to a certain extent.

In a Long Term Evolution (LTE) system, a data transmission channel is a shared channel, and uplink and downlink data transmission of the user equipments is realized based on scheduling. In the scheduling process, the user equipments need to be addressed. At present, a 16-bit Radio Network Temporary Identifier (RNTI) way is mainly used for addressing the user equipments. The RNTI has a variety of different types for different purposes and the common types comprise: a Paging Radio Network Temporary Identifier (P-RNTI) which is mainly used for addressing when scheduling a paging message; a System Information Radio Network Temporary Identifier (SI-RNTI) which is mainly used for addressing when scheduling a system message; and a Cell Radio Network Temporary Identifier (C-RNTI) which is mainly used for addressing when dynamically scheduling user data.

When the user equipment is in an idle state, the user equipment can receive the paging message and the system message, where the paging message and the system message are broadcast. For the LTE system, the paging message and the system message are transmitted by scheduling, that is, before sending the paging message and the system message, a network side firstly schedules physical resources for transmitting the paging message and the system message, i.e., Physical Downlink Shared Channel (PDSCH) resources, through a Physical Downlink Control Channel (PDCCH). For the paging message, the network side scrambles the PDCCH through the P-RNTI; and for the system message, the network side scrambles the PDCCH through the SI-RNTI. When the user equipment descrambles the PDCCH, the user equipment can respectively use the P-RNTI corresponding to the paging message and the SI-RNTI corresponding to the system message to descramble the PDCCH, thereby correctly obtaining scheduling information carried by the PDCCH. The user equipment receives the paging message or the system message in the indicated physical resource position according to the scheduling information carried on the PDCCH.

In order to reduce power consumption, the user equipment in the idle state monitors the paging message in a Discontinuous Reception (DRX) form according to a certain cycle, namely wakes up periodically to monitor the paging message scheduled by the PDCCH which is scrambled by the P-RNTI in a fixed position. The cycle of monitoring the scheduled paging message is called as a Paging DRX cycle, and the occasion of monitoring the scheduled paging message is called as Paging Occasion (PO). The formula of calculating System Frame Number (SFN) by the user equipment is as follows:

$$\text{SFN mod } T = (T \text{ div } N) * (\text{UE\_ID mod } N) \quad \text{(formula I)}$$

Where SFN is the position number of a radio frame where the PO is located, T is the Paging DRX cycle, N is decided by the configurations of the network side, and UE_ID is the International Mobile Subscriber Identity (IMSI) of the user equipment.

The user equipment can calculate the SFN of the occasion when the user equipment monitors the scheduled paging message according to the formula I, but the specific subframe in the radio frame, in which the scheduling of the paging message by the network side is monitored, still needs to be determined by $i\_s = \text{floor (UE\_ID/N) mod Ns}$ (formula II); where $i\_s$ is the position number of the subframe in the radio frame where the PO is located, and N and Ns are decided by network configurations.

Similarly, the network side can calculate the position number of the radio frame of the occasion when each user equipment monitors the paging message according to the formula I, and calculate the specific subframe in which each user equipment monitors the scheduling of the paging message by the network side according to the formula II, so that the network side can schedule the paging message of the user equipment in the position where the subframe is located when the network side needs to send the paging message to the user equipment.

As can be known from the formula I and the formula II, if different user equipments use different UE_IDs, the numbers of the specific subframes where the PO is located, which are obtained by calculation, may be different, but if different user equipments use the same UE_ID, the numbers of the specific subframes where the PO is located, which are obtained by calculation, must be the same.

For a Universal Mobile Telecommunications System (UMTS), a high speed data transmission technology, i.e., High Speed Downlink Packet Access (HSDPA)/High Speed Uplink Packet Access (HSUPA), is introduced after an R5 version. The HSDPA is used for downlink data transmission, and the HSUPA is used for uplink data transmission. The HSDPA adopts a scheduling-based data transmission mode to perform downlink data transmission and mainly comprises two physical channels, namely a High Speed Shared Control Channel (HS-SCCH) and a High Speed Physical Downlink Shared Channel (HS-PDSCH), where the HS-SCCH is used for scheduling and carrying physical resources which are allocated by the network side and used for data transmission, namely HS-PDSCH resources, and the HS-PDSCH is specifically used for bearing the data. The HS-SCCH uses a High Speed Downlink Shared Channel Radio Network Temporary Identifier (H-RNTI) for scrambling. The H-RNTI is allocated by a Radio Network Controller (RNC). When a user equipment enters the connection state, the RNC allocates an H-RNTI to the user equipment. In the downlink data transmission process, the user equipment uses the allocated H-RNTI to monitor the HS-SCCH, and if the HS-SCCH is correctly descrambled, the user equipment can receive the data sent from the network side to the user equipment at the physical resources allocated by the network side.

In the UMTS system, the user equipment in the idle state also monitors the paging message in the DRX form, but the transmission mechanism of the paging message of the UMTS system is different from the transmission mechanism of the paging message of the LTE system. In the UMTS system, the user equipment needs to receive a Paging Indicator Channel (PICH) in the DRX form. The PICH does not carry the specific content of the paging message and can only indicate whether the user equipment is paged. The content of the PICH consists of a series ($N_{PI}$) of paging indicators $P_q$, q=0, . . . , $N_{PI}$−1, $P_q \in \{0,1\}$, and the length $L_{PI}$ of each paging indicator in the PICH block can be 2, 4 or 8 data symbols. Under the modulation of Quadrature Phase Shift Keying (QPSK), $L_{PI}$ corresponds to 4, 8 or 16 consecutive bits. In the burst of the PICH, $N_{PIB}$=352 bits are used for carrying the paging indication. The number $N_{PI}$ of the paging indicators can be calculated by $N_{PI}=N_{PIB}/(2 L_{PI})$ (formula III). One PICH block can consist of $N_{PICH}$ consecutive paging indication frames, where the $N_{PICH}$ is configured by a high layer. Therefore, the number of the paging indicators in one PICH block is $N_P=N_{PICH}*N_{PI}$. Based on the above description, the calculation formula of the paging indicator of the user equipment is as follows:

$$PI=(IMSI \text{ div } 8192) \bmod N_P \qquad \text{(Formula IV)}$$

The value of the PI is associated with the paging indication $P_q$ of the $n^{th}$ frame of one PICH block, and q and n are obtained according to the following formula: q=PI mod $N_{PI}$ and n=PI div $N_{PI}$.

As can be known from the formula IV, the user equipment reads the paging indicator PI in the corresponding position, and if the bits of the PI are all 1 $\{1, 1, 1 \ldots, 1\}$, it means that the user equipment is required to receive the PICH channel and then page a paging subchannel in the block so as to determine whether paging of the user equipment is contained in the paging message; otherwise, the subsequent paging message does not need to be received.

If the user equipment finds that it is paged, the user equipment receives the paging message on the selected physical resource, namely a Secondary Common Control Physical Channel (SCCPCH), at a fixed time interval (Ngap, the value is configured by the network side). The network side can configure multiple SCCPCH channels, the method of selecting the SCCPCH channel for receiving the paging message by the user equipment is determined according to S-CCPCH index=IMSI mod K (formula V), where the S-CCPCH index is a number identifying the SCCPCH channel.

As can be known from the above discussion, in the UMTS system, when the user equipment in the idle state monitors its own paging message, the user equipment also needs to select the resource which needs to be used by itself from common resources according to its own IMSI. If the user equipments in one group use the same identity, the user equipments can monitor the same information at the same occasion.

In the prior art, the modes of transmitting data to a group consisting of at least one user equipment comprise system message broadcasting and paging message. As for the data transmission mode of the system message broadcasting, the system message is suitable for transmitting the data information to all the user equipments belonging to the same user and not suitable for transmitting the data information to a certain group of user equipments; and as for the data transmission mode of the paging message, the carried resources are limited, and when more data is carried in the data transmission mode, normal user equipments can be affected, and particularly, the receiving of the normal paging message by the normal edge user equipments can be affected. As can be known from the above analysis, when downlink data is transmitted to a certain group of user equipments through the prior art, the problem of low utilization rate of the network resources exists. Thus, there is no group-based downlink data transmission mode which is suitable for transmitting data to a certain group of user equipments at present.

SUMMARY OF THE INVENTION

Embodiments of the invention provide a method and device for downlink data transmission so as to reduce the waste of network resources and increase the utilization rate of the network resources when the network side transmits data to a certain group of user equipments.

The technical solutions according to the embodiments of the invention are as follows:

A method for downlink data transmission, comprising:

sending downlink data transmission scheduling information to a user equipment;

obtaining a corresponding occasion of sending a first message, wherein the first message is used for instructing the user equipment to receive downlink data;

sending the first message to the user equipment at the occasion; and transmitting the downlink data to the user equipment according to the downlink data transmission scheduling information.

A method for downlink data transmission, comprising:

receiving downlink data transmission scheduling information sent by a network side;

obtaining a corresponding occasion of receiving a first message, wherein the first message is used for instructing a user equipment side to receive downlink data;

receiving the first message sent by the network side at the occasion; and receiving the downlink data transmitted by the network side according to the downlink data transmission scheduling information.

A device for downlink data transmission, comprising:

a first transmission unit configured to send downlink data transmission scheduling information to a user equipment;

an obtaining unit configured to obtain a corresponding occasion of sending a first message, wherein the first message is used for instructing the user equipment to receive downlink data;

a second transmission unit configured to send the first message to the user equipment at the occasion; and a third transmission unit configured to transmit the downlink data to the user equipment according to the downlink data transmission scheduling information.

A device for downlink data transmission, comprising:

a first communication unit configured to receive downlink data transmission scheduling information sent by a network side;

an obtaining unit configured to obtain a corresponding occasion of receiving a first message, wherein the first message is used for instructing a user equipment side to receive downlink data;

a second communication unit configured to receive the first message sent by the network side at the occasion; and a third communication unit configured to receive the downlink data transmitted by the network side according to the downlink data transmission scheduling information.

In the embodiments of the invention, user equipments belonging to a same user or distributed relatively densely in a regional range are combined into a group. The user equipment needs to use the Group ID of its own belonging group or its own UE ID to monitor the first message sent for the group to which the user equipment belongs according to the formula I and the formula II introduced in the background, besides using its own UE_ID to monitor the paging message sent for the user equipment according to the formula I and the formula II introduced in the background. The signaling transmission can be optimized by managing and controlling the group to thereby achieve the effects of reducing the waste of the network resources and improving the utilization rate of the network resources when the network side transmits data to a certain group of user equipments in M2M communication.

DETAILED DESCRIPTION OF THE EMBODIMENTS

Figure 1:
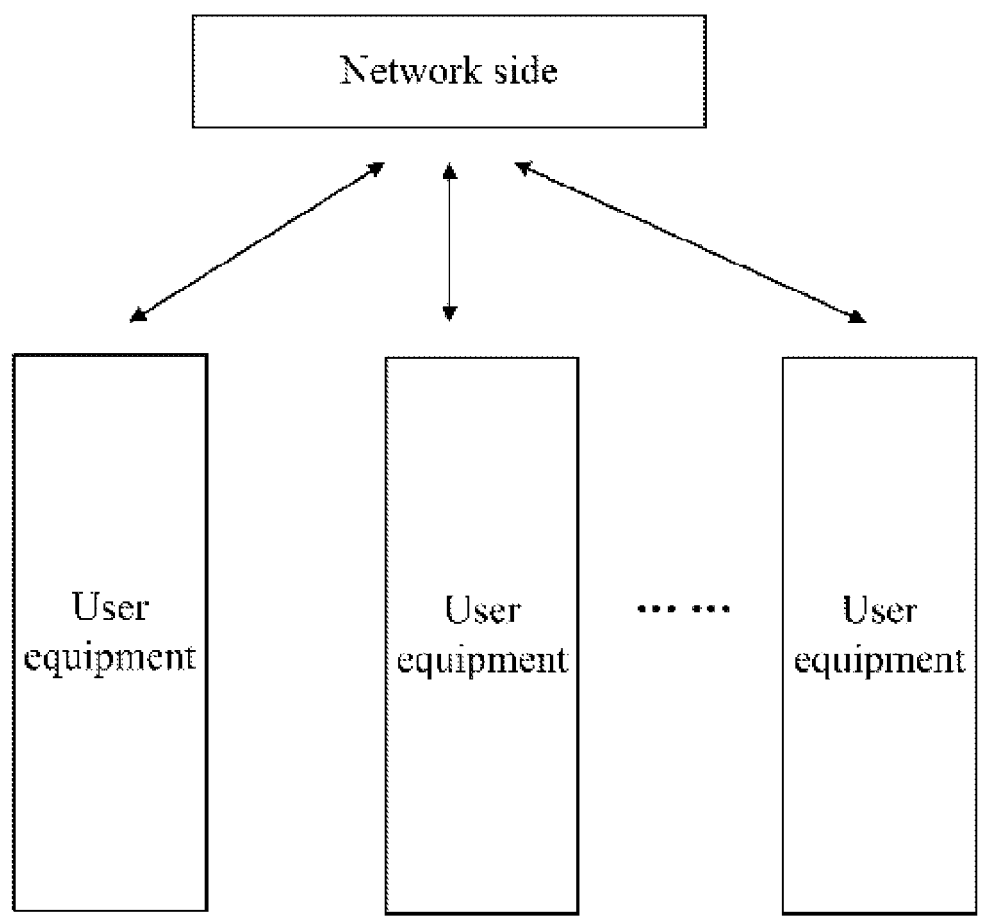
FIG. 1 is a schematic diagram of the system operation environment according to an embodiment of the invention.

In order to reduce the waste of network resources and improve the utilization rate of the network resources in M2M communication, an embodiment of the invention provides a downlink data transmission method. User equipments belonging to a same user or distributed relatively densely in a regional range are combined into a group, each group is uniquely identified with one Group ID, and the user equipment in the idle state still monitors a first message. The first message may be a paging message or a control channel message, where the control channel may be a PDCCH or an HS-SCCH. Besides using its own UE_ID to monitor the paging message for itself according to the formula I and the formula II introduced in the background, each user equipment also needs to use the Group ID of the group, to which the user equipment belongs, to monitor the first message sent for the group, to which the user equipment belongs, according to the formula I and the formula II introduced in the background.

The network side sends the first message to the user equipment at an occasion corresponding to the first message through the set physical resource. If the first message is the paging message, the network side makes the paging message carrying the Group ID of the group to which the user equipment belongs or carrying the Group ID of the group to which the user equipment belongs and downlink data transmission indication (data-flag); and if the first message is the control channel message, the network side makes the control channel message carrying the Group ID of the group to which the user equipment belongs, where the network side may be a base station or an RNC.

Taking the paging message as an example, when the network side transmits downlink data to a certain group of user equipments, the network side pages the group of user equipments at the paging occasion of the group, where the paging message carries the Group ID of the group to notify all the user equipments in the group. The user equipments receiving the paging message can receive the downlink data at a fixed physical resource position within a fixed time length (i.e., a time window), and then behaviors of the user equipments are changed so that the user equipments can receive downlink scheduling resources allocated by the network side without entering the Radio Resource Control (RRC) connection state. The network side can ensure the reliability of downlink data transmission by transmitting the same data multiple times within the fixed time length. The fixed time length, the fixed physical resource and downlink data transmission intervals can be broadcast through a system message or sent through an RRC message. All the user equipments of all the groups can use the set of parameters. The fixed physical resource can be scheduled to other user equipments for use by the network side when no downlink group of data is transmitted, and once a certain group of data is transmitted, the network side will not schedule the fixed physical resource to other user equipments for use in the data transmission process.

If the user equipments can receive the downlink scheduling resources allocated by the network side without entering the RRC connection state, the network side sends the fixed time length, the fixed physical resource and the downlink data transmission intervals through the RRC message. Specifically, when the user equipments are in the RRC connection state, the network side sends the fixed time length, the fixed physical resource and the downlink data transmission intervals through the RRC message. The user equipments save the received fixed time length, fixed physical resource and downlink data transmission intervals. After the user equipments exit the RRC connection state, the user equipments can receive the downlink scheduling resources allocated by the network side according to these saved information.

Alternatively, the user equipments in the idle state can monitor a group paging occasion according to the above method. When the network side transmits the downlink data to the group of user equipments, the network side notifies all the user equipments in the group through the paging message carrying the Group ID at the group paging occasion. A C-RNTI (which is dynamically allocated by the network side and the same as the normal C-RNTI) or an H-RNTI (allocated by the RNC) corresponding to the group is simultaneously carried in the paging message. The user equipments receiving the paging message can monitor the PDCCH which is scrambled by the received C-RNTI or the HS-SCCH which is scrambled by the H-RNTI within the fixed time length. After the time length exceeds, the C-RNTI or the H-RNTI is released. The time length can be sent through the system message or the RRC message, and all the user equipments in all the groups use the same time length. After monitoring the PDCCH which is scrambled by the corresponding C-RNTI or the HS-SCCH which is scrambled by the corresponding H-RNTI, the user equipments can receive the downlink data in the physical resource position which is scheduled by the PDCCH or the HS-SCCH.

In order to reduce the waste of network resources and improve the utilization rate of the network resources in M2M communication, an embodiment of the invention provides another downlink data transmission method. User equipments which belong to a same user or are distributed relatively densely in a regional range are combined into a group. Each user equipment in the idle state still monitors a first message, where the first message may be a paging message or a control channel message. The control channel may be a PDCCH or an HS-SCCH. Each user equipment needs to use its own UE_ID to monitor the messages according to the formula I and the formula II introduced in the background so as to obtain the first message sent for the group to which the user equipment belongs.

The network side sends the first message to the user equipment at an occasion corresponding to the first message through the set physical resource. If the first message is the paging message, the network side makes the paging message carrying the UE ID of the user equipment and downlink data transmission indication (data-flag); and if the first message is the control channel message, the network side makes the control channel message carrying the UE ID of the user equipment, where the network side may be a base station or an RNC.

Taking the paging message as an example, when the network side transmits downlink data to a certain group of user equipments, the network side pages the group of user equipments at a paging occasion of the group. The group paging occasions for the different user equipments in the group may be different. The paging message sent to each user equipment in the group carries the UE ID of the user equipment and the downlink data transmission indication to notify the user equipment. The user equipment receiving the paging message can receive the downlink data at a fixed physical resource position within a fixed time length (i.e., a time window), and then behaviors of the user equipment are changed so that the user equipment can receive downlink scheduling resources allocated by the network side without entering the RRC connection state. The network side can ensure the reliability of downlink data transmission by transmitting the same data multiple times within the fixed time length. The fixed time length, the fixed physical resource and downlink data transmission intervals can be broadcast through a system message or sent through an RRC message. All the user equipments in the group can use the set of parameters. The fixed physical resource can be scheduled to other user equipments for use by the network side when no downlink group of data is transmitted, and once a certain group of data is transmitted, the network side will not schedule the fixed physical resource to other user equipments for use in the data transmission process.

Taking it as an example that the network side uses the system message, such as a System Information Broadcast (SIB) message, to notify the user equipment of downlink data transmission scheduling information, and uses the paging message to notify the user equipment to receive the transmitted downlink data, the preferred implementations of the invention will be described below in details in combination with the accompanying drawings.

As shown in FIG. 1, in an embodiment of the invention, the system operation environment comprises a network side and a plurality of user equipments.

Figure 2:
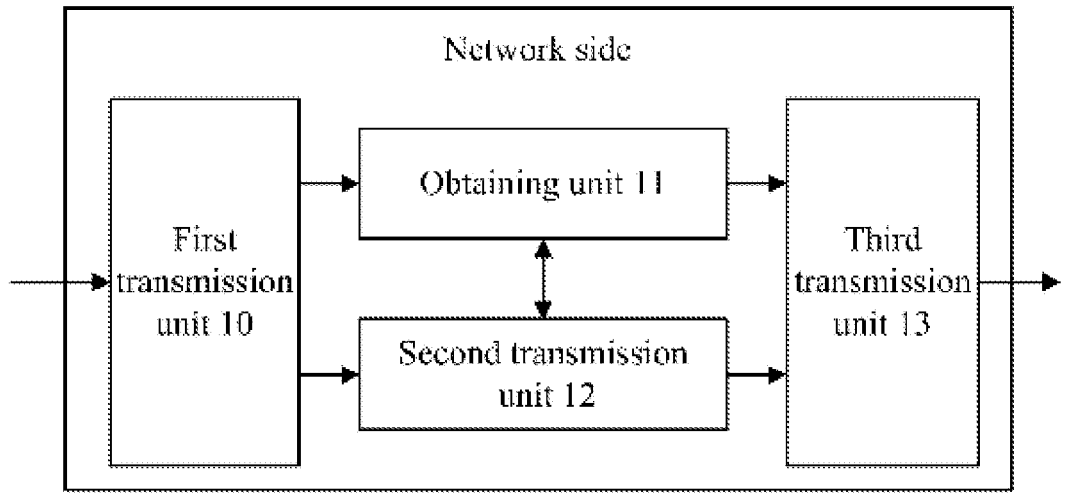
FIG. 2 is a schematic diagram of a functional structure of a network side according to an embodiment of the invention.

As shown in FIG. 2, in an embodiment of the invention, the network side comprises a first transmission unit 10, an obtaining unit 11, a second transmission unit 12 and a third transmission unit 13, wherein:

the first transmission unit 10 is configured to send downlink data transmission scheduling information to the user equipments;

the obtaining unit 11 is configured to obtain a corresponding occasion of sending a first message, where the first message is used for instructing the user equipment side to receive downlink data;

the second transmission unit 12 is configured to send the first message to the user equipments at the occasion; and the third transmission unit 13 is configured to transmit the downlink data to the user equipments according to the downlink data transmission scheduling information.

Figure 3:
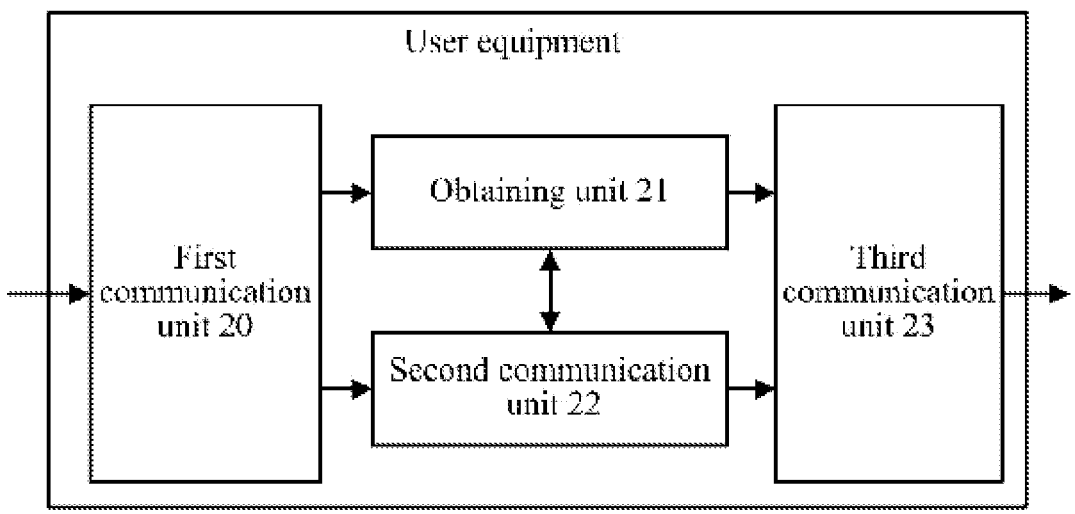
FIG. 3 is a schematic diagram of a functional structure of a user equipment according to an embodiment of the invention.

As shown in FIG. 3, in an embodiment of the invention, each user equipment comprises a first communication unit 20, an obtaining unit 21, a second communication unit 22 and a third communication unit 23, wherein:

the first communication unit 20 is configured to receive downlink data transmission scheduling information sent by the network side;

the obtaining unit 21 is configured to obtain a corresponding occasion of receiving a first message, where the first message is used for instructing the user equipment side to receive downlink data;

the second communication unit 22 is configured to receive the first message sent by the network side at the occasion; and the third communication unit 23 is configured to receive the downlink data transmitted by the network side according to the downlink data transmission scheduling information.

Figure 4A:
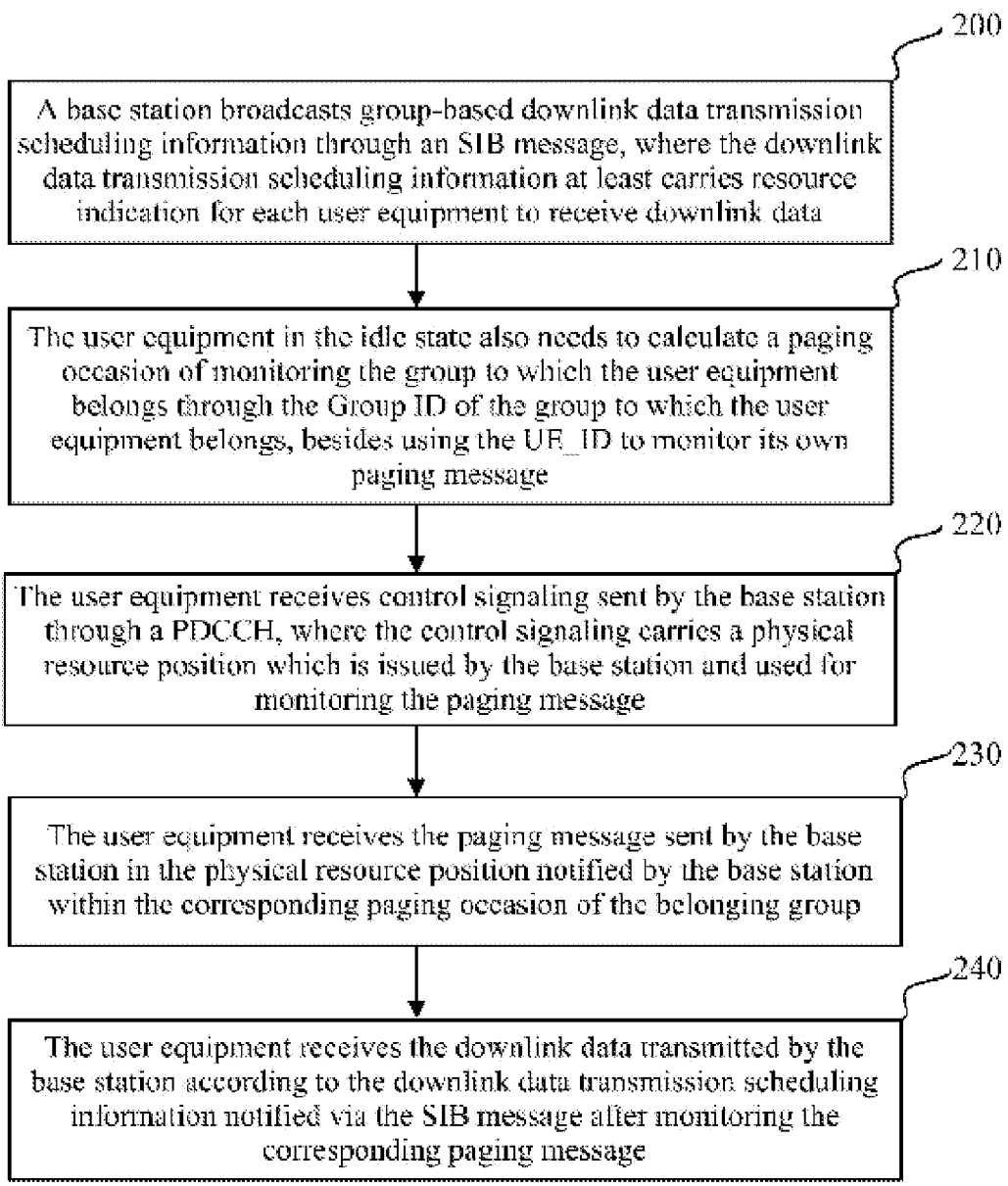
FIG. 4A is a detailed flow chart of a first kind of group-based downlink data transmission for the LTE system according to an embodiment of the invention.

Based on the above system architecture, as shown in FIG. 4A, in an embodiment of the invention, the first one of the detailed flows of the group-based downlink data transmission as for the LTE system is as follows:

Step 200: a base station broadcasts group-based downlink data transmission scheduling information through an SIB message, where the downlink data transmission scheduling information at least carries resource indication for each user equipment to receive downlink data.

Of course, the base station can send the group-based downlink data transmission scheduling information through an RRC message, and in the embodiment, only the SIB message in the broadcasting form is taken as an example.

The specific content of the downlink data transmission scheduling information can comprise: time length (i.e., a time window) when the user equipments in the group receive the downlink data transmitted by the base station, physical resource for receiving the downlink data transmitted by the base station and downlink data transmission intervals. Further, the specific content can also comprise subframe offset of receiving the downlink data transmitted by the base station.

The time length when the user equipments receive the downlink data transmitted by the base station is the downlink data transmission time length indicated in the downlink data transmission scheduling information.

The position of a subframe determined by the subframe offset of receiving the downlink data transmitted by the base station is the position of a starting subframe bearing downlink data transmission.

In an embodiment of the invention, a specific form of the SIB message may be as follows:

```
Group-scheduling-info::=      SEQUENCE {
    scheduling-Config              SEQUENCE {
        duration                   ENUMERATED {rf32, rf64, rf128},
        RepetitionPeriod           ENUMERATED {rf4, rfS, rf16}
                                   OPTIONAL,
        Offset                     INTEGER (0.. 159)    OPTIONAL
    },
    Phy-resource-Config                                 SEQUENCE {
    ...
    }
}
```

Step 210: the user equipment in the idle state also needs to calculate a paging occasion of monitoring the group to which the user equipment belongs through the Group ID of the group to which the user equipment belongs, besides using the UE_ID to monitor its own paging message.

The paging occasion of the group to which the user equipment belongs is the occasion of sending/receiving the paging message.

The formula of calculating by the user equipment the position number SFN of a radio frame where the paging occasion of the belonging group is located is as follows:

$$\text{SFN mod } T = (T \text{ div } N) * (\text{Group ID mod } N) \quad \text{(formula VI)}$$

where SFN is the position number of the radio frame where the paging occasion of the belonging group is located, T is a Paging DRX cycle, N is decided by configurations of the base station, and the Group ID is the identity of the group to which the user equipment belongs.

The user equipment can calculate the SFN where the occasion, at which the group to which the user equipment belongs monitors the scheduled paging message, is located according to the formula VI, but the specific subframe in the radio frame, in which the scheduling of the paging message by the base station is monitored, still needs to be determined by $i\_s = \text{floor}(\text{Group\_ID}/N) \text{ mod } Ns$ (formula VII); where $i\_s$ is the position number of the subframe in the radio frame where the paging occasion of the group to which the user equipment belongs is located, and N and Ns are decided by the configurations of the base station.

The Group ID of the group to which the user equipment belongs is set in a card of the user equipment, where the card can be a Subscriber Identity Module (SIM) card or a Universal Subscriber Identity Module (USIM) card, and the Group ID of each group is uniquely determined.

In actual applications, in addition to calculation of the paging occasion of monitoring the belonging group according to the Group ID of the group to which the user equipment belongs, the paging occasion of monitoring the belonging group can also be calculated according to the user equipment identifier (UE ID). The embodiment of the invention only takes the former as an example for description but is not limited to this in actual operations.

If the paging occasion of monitoring the belonging group is calculated according to the user equipment identifier, specifically, the user equipment calculates the paging occasion according to the formula I and the formula II introduced in the background, and in the present application, the paging occasion is the paging occasion of the belonging group. The paging occasion of the belonging group for the different user equipments in the group may vary. At the base station side, for the user equipment identifier of each user equipment in one group, the base station respectively calculates the paging occasion of the group to which the corresponding user equipment belongs according to the formula I and the formula II introduced in the background.

Step 220: the user equipment receives control signaling sent by the base station through a PDCCH, where the control signaling carries a physical resource position which is issued by the base station and used for monitoring the paging message.

The base station uses a P-RNTI to scramble the control signaling sent via the PDCCH. Since the P-RNTI is specified in the protocol, the user equipment can use the corresponding P-RNTI to descramble the received control signaling according to the related protocol to thereby obtain the physical resource position which is issued by the base station and used for monitoring the paging message.

Step 230: the user equipment receives the paging message sent by the base station in the physical resource position notified by the base station within the corresponding paging occasion of the belonging group.

In actual applications, the user equipment can periodically monitor the paging message in the physical resource position notified by the base station within the corresponding paging occasion of the belonging group, where the paging message carries the Group ID of the group to which the user equipment belongs or carries the Group ID of the group to which the user equipment belongs and downlink data transmission indication (data-flag). Taking into account of the limited size of the paging message, preferably each paging message only carries one or a few Group IDs.

In an embodiment of the invention, a specific form of the paging message may be as follows:

```
Paging-vb00-IEs ::=        SEQUENCE {
    pagingGroupRecordList    PagingGroupRecordList OPTIONAL,
                             -- Need ON
    nonCriticalExtension     SEQUENCE { }
OPTIONAL -- Need OP
}
PagingGroupRecordList ::=   SEQUENCE (SIZE (1..maxPageGruop))
                             OF PagingGroupRecord
PagingGroupRecord ::=           SEQUENCE {
    group-Identity              Group-Identity,
    data-flag                       ENUMERATED   {true}
                                    OPTIONAL,
```

In addition to the situation that the user equipment can be notified to start to receive the downlink data of the group through the paging message, the base station can also notify the user equipment to start to receive the downlink data of the group through a special control channel. The special control channel mentioned herein can be a PDCCH, where the PDCCH carries the corresponding Group ID.

As mentioned above, in addition to calculation of the paging occasion of monitoring the belonging group according to the Group ID of the group to which the user equipment belongs, the paging occasion of the belonging group can also be calculated according to the user equipment identifier.

It should be noted that, if the paging occasion of monitoring the belonging group is calculated according to the user equipment identifier, the user equipment does not distinguish the paging occasion of the belonging group from its own paging occasion.

If the paging occasion of monitoring the belonging group is calculated according to the user equipment identifier in the step 220, then in the step 230 in the actual application, the user equipment can periodically monitor the paging message in the physical resource position notified by the base station within the paging occasion corresponding to the belonging group, where the paging message carries the UE ID of the user equipment and the downlink data transmission indication (data-flag).

Step 240: the user equipment receives the downlink data transmitted by the base station according to the downlink data transmission scheduling information notified via the SIB message after monitoring the corresponding paging message.

Specifically, when the user equipment monitors that the paging message carries the Group ID of its own belonging group or when the user equipment monitors that the paging message carries the Group ID of its own belonging group and the downlink data transmission indication (data-flag), the user equipment receives the downlink data transmitted by the base station repeatedly in the fixed physical resource position notified via the SIB message by using the downlink data transmission time length (i.e., the time window) notified and the downlink data transmission intervals via the SIB message at the next subframe (or the next subframe+offset subframe) after receiving the paging message. The fixed physical resource position notified via the SIB message is the position of the starting subframe bearing the downlink data transmission, and the downlink data transmission scheduling information comprises the physical resource used by UE to receive the downlink data transmitted by the base station. The position of the starting subframe bearing the downlink data transmission is the position of the subframe determined according to the subframe offset of receiving the downlink data transmitted by the base station in the step 200, where the subframe offset is included in the downlink data transmission scheduling information.

The time length of receiving the downlink data is configured in the SIB message by the base station. The base station starts to transmit the downlink data of the group at the same physical resource where the user equipments in the group receive the downlink data from the same time. The base station may periodically repeatedly transmit the downlink data to ensure the reliability of the downlink data transmission. If the time length exceeds, the base station stops the transmission of the downlink data, and the user equipments in the group also stop the receiving of the downlink data. If the paging message received by the user equipment contains its own UE_ID and the Group ID of its own belonging group, the user equipment triggers the RRC connection establishing process and does not perform the operation of receiving the downlink data.

Specifically, the base station transmits the downlink data to the user equipments according to the downlink data transmission time length, the position of the starting subframe bearing the downlink data transmission and the downlink data transmission intervals indicated in the downlink data transmission scheduling information.

As mentioned above, in addition to calculation of the paging occasion of monitoring the belonging group according to the Group ID of the group to which the user equipment belongs, the paging occasion of the belonging group can also be calculated according to the user equipment identifier.

If the paging occasion of monitoring the belonging group is calculated according to the user equipment identifier in the step 220, then the step 240 is specifically as follows: when the user equipment monitors that the paging message carries its own UE ID and downlink data transmission indication, the user equipment determines the time of starting to receive the data in the following formula (VIII), and repeatedly receives, at the time point determined by the formula (VIII), the downlink data transmitted by the base station at the fixed physical resource position notified via the SIB message by using the downlink data transmission time length (i.e., the time window) and the downlink data transmission intervals notified via the SIB message.

$$\text{SFN mod } m = 0 \qquad \text{formula (VIII)}$$

where m is the time length which is configured by the network side or specified by the protocol, and the time length is an integer multiple of the paging cycle and used as the time when all the user equipments in the belonging group receive the data. After the user equipment monitors that the paging message carries its own UE ID and the downlink data transmission indication, the first SFN meeting the formula (VIII) is the time of receiving the data.

The time length of receiving the downlink data is configured in the SIB message by the base station. The base station determines the time of starting to send the data according to the formula (VIII), and transmits the downlink data of the group in the same physical resource where the user equipments in the group receive the downlink data starting from the same time. The base station may periodically repeatedly transmit the downlink data to ensure the reliability of the downlink data transmission. If the time length exceeds, the base station stops the transmission of the downlink data, and the user equipments in the group also stop the receiving of the downlink data. If the paging message received by the user equipment contains its own UE_ID and the Group ID of its own belonging group, the user equipment triggers the RRC connection establishing process and does not perform the operation of receiving the downlink data.

Specifically, the base station uses the above formula (VIII) to determine the time of starting to send the data, and transmits, at the time point determined by the formula (VIII), the downlink data to the user equipments according to the downlink data transmission time length, the position of the starting subframe bearing the downlink data transmission and the downlink data transmission intervals indicated in the downlink data transmission scheduling information.

Figure 4B:
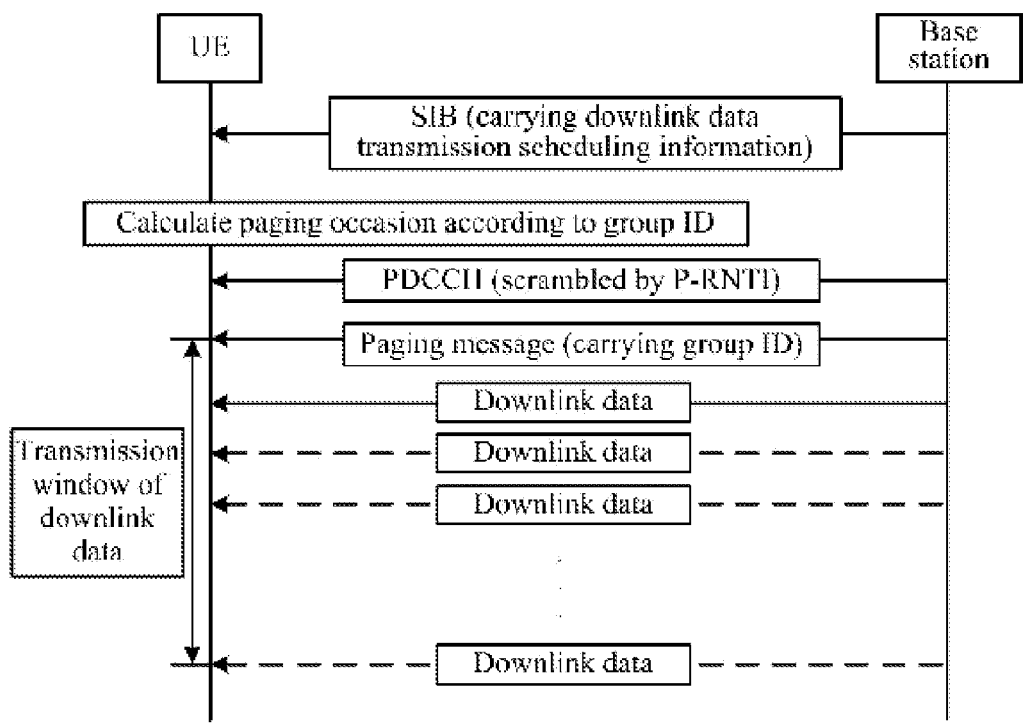
FIG. 4B is a schematic diagram of the first kind of group-based downlink data transmission for the LTE system according to an embodiment of the invention.

For the LTE system, the schematic diagram of the first kind of group-based downlink data transmission is as shown in FIG. 4B.

Figure 5A:
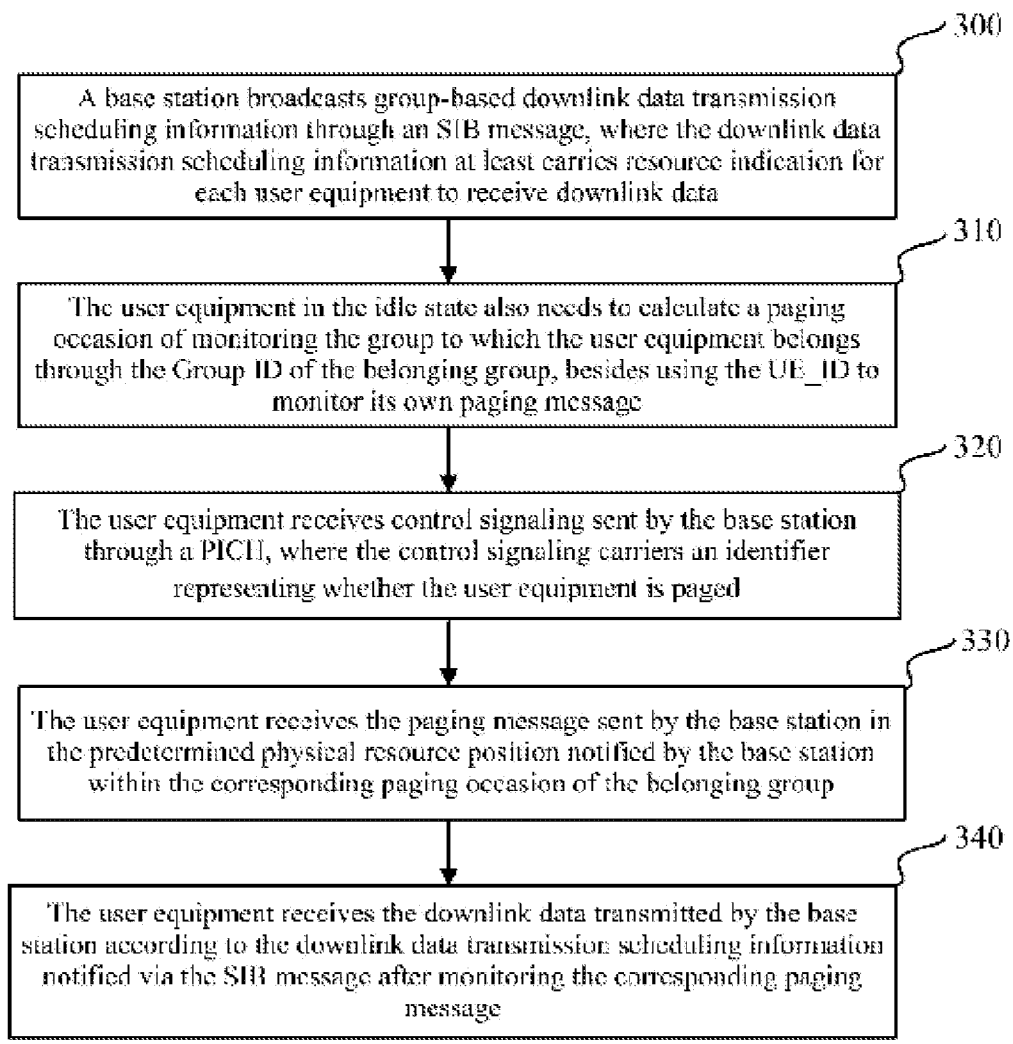
FIG. 5A is a detailed flow chart of a first kind of group-based downlink data transmission for the UMTS system according to an embodiment of the invention.

Based on the above system architecture, as shown in FIG. 5A, in an embodiment of the invention, the first one of the The specific content of the downlink data transmission scheduling information can comprise: time length when the user equipments in the group receive the downlink data transmitted by the base station, physical resource for receiving the downlink data transmitted by the base station and downlink data transmission intervals. Further, the specific content can also comprise subframe offset of receiving the downlink data transmitted by the base station.

The time length when the user equipments receive the downlink data transmitted by the base station is the downlink data transmission time length indicated in the downlink data transmission scheduling information.

The position of a subframe determined by the subframe offset of receiving the downlink data transmitted by the base station is the position of a starting subframe bearing downlink data transmission.

In an embodiment of the invention, the specific form of the SIB message can be as shown in Table 1:

TABLE 1

| Name of information unit/group | Need | Multiple | Type and reference | Static description |
|---|---|---|---|---|
| PICH list related to HS-DSCH | Optional | 1 to maximum number of SCCPCHs | | |
| PICH information associated with HSDPA | Required | | Paging channel information 10.3.6.49 | |
| Size of receiving window | Required | | Integer (1 . . . 16) | |
| Information related to HS-PDSCH | Optional | | | |
| HS-PDSCH information | Required | 1 to maximum number of SCCPCHs | | |
| >>HS-PDSCH channel estimation training code configuration | Required | | HS-PDSCH channel estimation training code configuration 10.3.6.36oo | |
| Time slot resource information | Required | | Bit string (6) | |
| Codeword resource information | Required | | | |
| Starting codeword | Required | | Enumeration ((16/1) . . . (16/16)) | |
| Stopping codeword | Required | | Enumeration ((16/1) . . . (16/16)) | |
| Size list of transmission blocks | Required | 1 to n | | |
| Size index of transmission blocks | Required | | Integer (1 . . . 32) | |
| Repetition cycle | Optional | | Enumeration (8, 16, 32, 64) | Repetition cycle of data resources of transmission group, radio frame |
| Offset | Optional | | Integer (0 . . . 127) | Subframe | detailed flows of the group-based downlink data transmission as for the UMTS system is as follows:

Step 300: a base station broadcasts group-based downlink data transmission scheduling information through an SIB message, where the downlink data transmission scheduling information at least carries resource indication for each user equipment to receive downlink data.

Of course, the base station can send the group-based downlink data transmission scheduling information through an RRC message, and in the embodiment, only the SIB message in the broadcasting form is taken as an example.

Step 310: the user equipment in the idle state also needs to calculate a paging occasion of monitoring the group to which the user equipment belongs through the Group ID of the belonging group, besides using the UE_ID to monitor its own paging message.

The user equipment can calculate the position number SFN of the radio frame where paging occasion of the belonging group is located according to the formula VI and determine the specific subframe in the radio frame, in which the scheduling of the paging message by the base station is monitored, according to the formula VII.

The Group ID of the group to which the user equipment belongs is set in a card of the user equipment, where the card can be an SIM card or a USIM card, and the Group ID of each group is uniquely determined.

Of course, the user equipment can also calculate the paging occasion of monitoring the belonging group through its own UE_ID, and the specific implementation can refer to the description of the above embodiment and will not be discussed here.

Step 320: the user equipment receives control signaling sent by the base station through a PICH, where the control signaling carriers an identifier representing whether the user equipment is paged.

Step 330: the user equipment receives the paging message sent by the base station in the predetermined physical resource position notified by the base station within the corresponding paging occasion of the belonging group.

In actual applications, the user equipment can periodically monitor the paging message in the predetermined physical resource position notified by the base station within the corresponding paging occasion of the belonging group, where the paging message carries the Group ID of the group to which the user equipment belongs or carries the Group ID of the group to which the user equipment belongs and downlink data transmission indication (data-flag). Taking into account of the limited size of the paging message, preferably each paging message only carries one or a few Group IDs.

In an embodiment of the invention, the specific form of the paging message can be as shown in Table 2:

channel message, the control channel message carries the UE ID of the user equipment.

Step 340: the user equipment receives the downlink data transmitted by the base station according to the downlink data transmission scheduling information notified via the SIB message after monitoring the corresponding paging message.

Specifically, when the user equipment monitors that the paging message carries the Group ID of its own belonging group or when the user equipment monitors that the paging message carries the Group ID of its own belonging group and the downlink data transmission indication (data-flag), the user equipment receives the downlink data transmitted by the base station repeatedly in the fixed physical resource position notified via the SIB message by using the downlink data transmission time length notified and the downlink data transmission intervals via the SIB message at the next subframe (or the next subframe+offset subframe) after receiving the paging message. The fixed physical resource position notified via the SIB message is the position of the starting subframe bearing the downlink data transmission, and the downlink data transmission scheduling information comprises the physical resource used by UE to receive the downlink data transmitted by the base station. The position of the starting subframe bearing the downlink data transmission is the position of the subframe determined according to the subframe offset of receiving the downlink data transmitted by the base station in the step 300, where the subframe offset is included in the downlink data transmission scheduling information.

TABLE 2

| Name of information unit/group | Need | Multiple | Type and reference |
|---|---|---|---|
| Message type | Required | | Message type |
| User equipment information | | | |
| List of paging records | Optional | 1 to maximum number of paging channels | |
| Paging records | Required | | Paging records 10.3.3.23 |
| List of paging groups | Optional | 1 to maximum number of groups | Taking into account of limited transmission resources of paging message, a few Group IDs are carried |
| Group ID | Required | | |
| Data ID | Optional | | |
| Other information | | | |
| Broadcast control channel change information | Optional | | Broadcast control channel change information 10.3.8.1 |
| Seismic and sea wave information | Optional | | Seismic and sea wave information 10.3.8.4ea |

In addition to the situation that the user equipment can be notified to start to receive the downlink data of the group through the paging message, the base station can also notify the user equipment to start to receive the downlink data of the group through a special control channel. The special control channel mentioned herein can be a PDCCH, where the PDCCH carries the corresponding Group ID.

As described above, if the user equipment calculates the paging occasion of monitoring the belonging group through its own UE_ID and uses the paging message, the paging message carries the UE ID of the user equipment and the downlink data transmission indication; and if the user equipment calculates the paging occasion of monitoring the belonging group through its own UE ID and uses the control The time length of receiving the downlink data is configured in the SIB message by the base station. The base station starts to transmit the downlink data of the group at the same physical resource where the user equipments in the group receive the downlink data from the same time. The base station may periodically repeatedly transmit the downlink data to ensure the reliability of the downlink data transmission. If the time length exceeds, the base station stops the transmission of the downlink data, and the user equipments in the group also stop the receiving of the downlink data. If the paging message received by the user equipment contains its own UE_ID and the Group ID of its own belonging group, the user equipment triggers the RRC connection establishing process and does not perform the operation of receiving the downlink data.

As described above, if the user equipment calculates the paging occasion of monitoring the belonging group through its own UE_ID and uses the paging message, the step 340 is specifically as follows: when the user equipment monitors that the paging message carries its own UE ID and downlink data transmission indication, the user equipment determines the time of starting to receive the data in the following formula (VIII), and repeatedly receives, at the time point determined by the formula (VIII), the downlink data transmitted by the base station at the fixed physical resource position notified via the SIB message by using the downlink data transmission time length (i.e., the time window) and the downlink data transmission intervals notified via the SIB message.

$$SFN \bmod m=0 \qquad \text{formula (VIII)}$$

where m is the time length which is configured by the network side or specified by the protocol, and the time length is an integer multiple of the paging cycle. After the user equipment monitors that the paging message carries its own UE ID and the downlink data transmission indication, the first SFN meeting the formula (VIII) is the time of receiving the data.

Figure 5B:
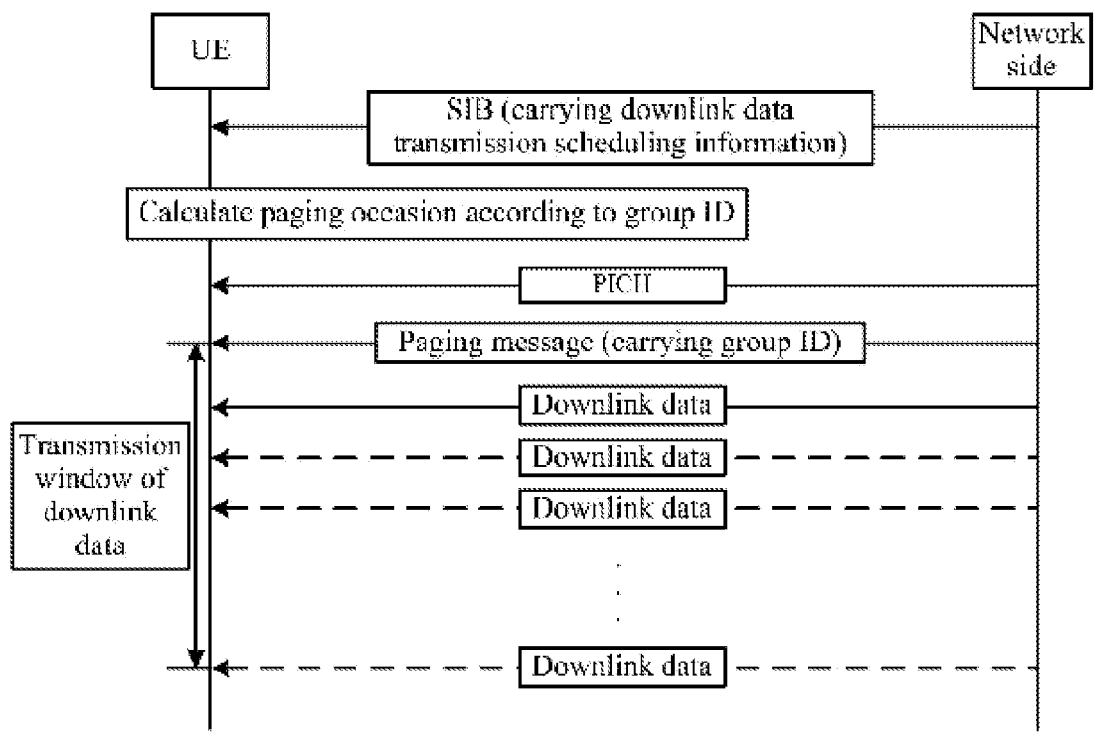
FIG. 5B is a schematic diagram of the first kind of group-based downlink data transmission for the UMTS system according to an embodiment of the invention.

For the UMTS system, the schematic diagram of the first kind of group-based downlink data transmission is as shown in FIG. 5B.

Figure 6A:
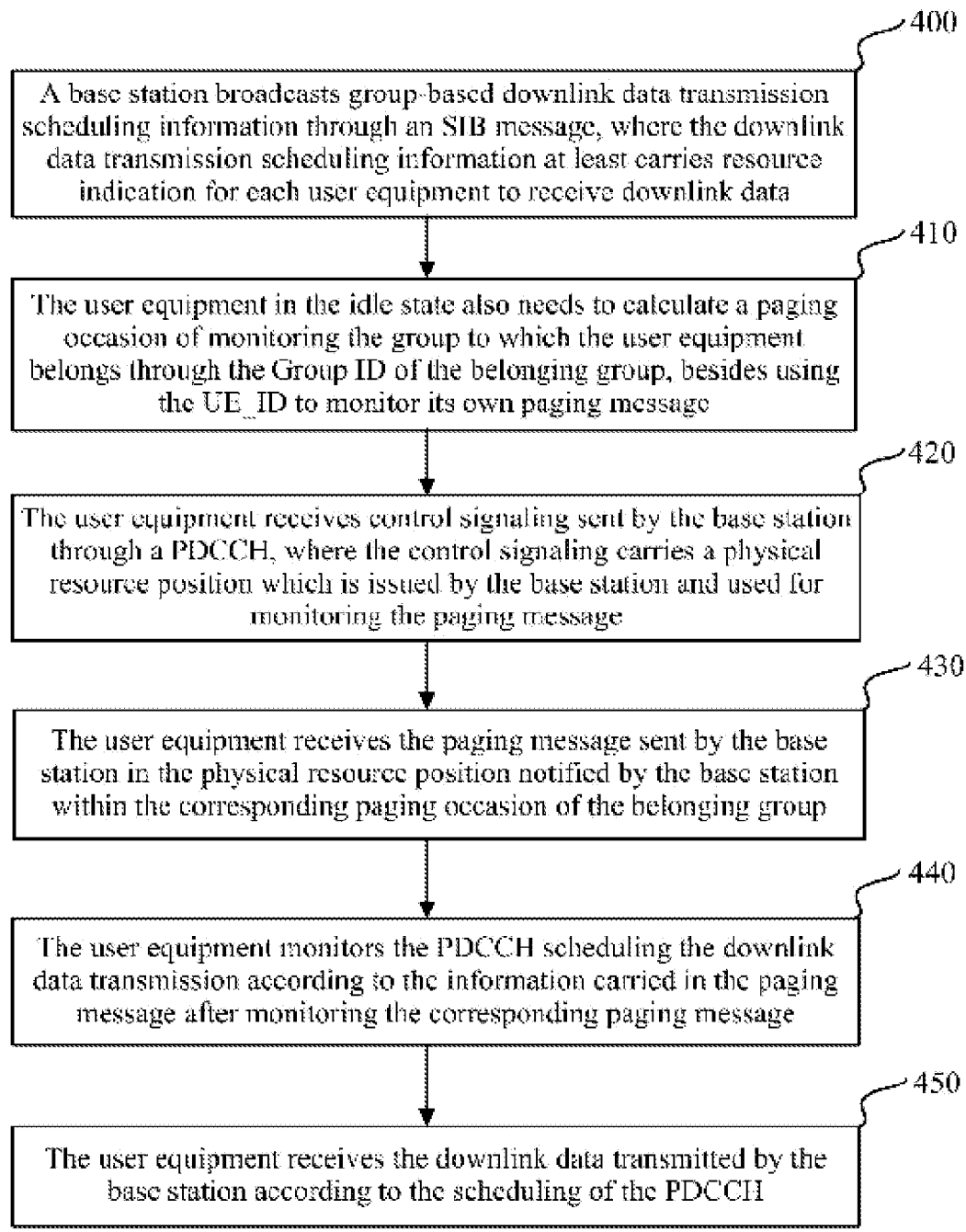
FIG. 6A is a detailed flow chart of a second kind of group-based downlink data transmission for the LTE system according to an embodiment of the invention.

Based on the above system architecture, as shown in FIG. 6A, in an embodiment of the invention, the second one of the detailed flows of the group-based downlink data transmission as for the LTE system is as follows:

Step 400: a base station broadcasts group-based downlink data transmission scheduling information through an SIB message, where the downlink data transmission scheduling information at least carries resource indication for each user equipment to receive downlink data.

Of course, the base station can send the group-based downlink data transmission scheduling information through an RRC message, and in the embodiment, only the SIB message in the broadcasting form is taken as an example.

The specific content of the downlink data transmission scheduling information can comprise: time length of monitoring a control channel by the user equipment in the group and a physical resource position of a PDCCH scheduling downlink data transmission. Further, the specific content can also comprise subframe offset of receiving the downlink data transmitted by the base station.

Step 410: the user equipment in the idle state also needs to calculate a paging occasion of monitoring the group to which the user equipment belongs through the Group ID of the belonging group, besides using the UE_ID to monitor its own paging message.

The user equipment can calculate the position number SFN of the radio frame where paging occasion of the belonging group is located according to the formula VI and determine the specific subframe in the radio frame, in which the scheduling of the paging message by the base station is monitored, according to the formula VII.

The Group ID of the group to which the user equipment belongs is set in a card of the user equipment, where the card can be an SIM card or a USIM card, and the Group ID of each group is uniquely determined.

Step 420: the user equipment receives control signaling sent by the base station through a PDCCH, where the control signaling carries a physical resource position which is issued by the base station and used for monitoring the paging message.

The base station uses a P-RNTI to scramble the control signaling sent via the PDCCH. Since the P-RNTI is specified in the protocol, the user equipment can use the corresponding P-RNTI to descramble the received control signaling according to the related protocol to thereby obtain the physical resource position which is issued by the base station and used for monitoring the paging message.

Step 430: the user equipment receives the paging message sent by the base station in the physical resource position notified by the base station within the corresponding paging occasion of the belonging group.

In actual applications, the user equipment can periodically monitor the paging message in the physical resource position notified by the base station within the corresponding paging occasion of the belonging group, where the paging message not only can carry the Group ID of the group, but also can carry the Group ID of the group to which the user equipment belongs and downlink data transmission indication (data-flag). Further, the paging message can also carry a C-RNTI for notifying the user equipment to perform control channel addressing.

In an embodiment of the invention, a specific form of the paging message is as follows:

```
Paging-vxxx-IEs ::=        SEQUENCE {
    pagingGroupRecordList      PagingGroupRecordList  OPTIONAL,--
                               Need ON
    nonCriticalExtension       SEQUENCE { }           OPTIONAL--
Need OP
    }
PagingGroupRecordList ::=      SEQUENCE (SIZE (1..maxPageGruop))
                               OF
PagingGroupRecord
PagingGroupRecord ::=          SEQUENCE {
    group-Identity             Group-Identity,
    c-RNTI                     C-RNTI,
    ...
    }
```

Step 440: the user equipment monitors the PDCCH scheduling the downlink data transmission according to the information carried in the paging message after monitoring the corresponding paging message.

In the process of scheduling the downlink data transmission to the user equipments through the PDCCH, the base station uses the C-RNTI carried in the paging message to scramble the PDCCH. When the user equipment monitors that the paging message carries the Group ID of its own belonging group or monitors that the paging message carries the Group ID of its own belonging group and downlink data transmission indication (data-flag), the user equipment can use the C-RNTI carried in the paging message to monitor the PDCCH scheduling the downlink data transmission and also use the C-RNTI to descramble the corresponding PDCCH according to the monitoring time length (i.e., time window) of the control channel notified via the SIB message at the next subframe (or the next subframe+offset subframe) after receiving the paging message, to thereby obtain a downlink data scheduling mode so as to receive the downlink data transmitted by the base station in the downlink data scheduling mode. Namely, the user equipment monitors the physical resource position of the control channel scheduling the downlink data transmission according to the monitoring time length (i.e., the time window) of the control channel notified via the SIB message at the next subframe (or the next subframe+offset subframe) after receiving the paging message; where specifically, the user equipment tries to demodulate the PDCCH within the monitoring time length through the C-RNTI carried in the paging message, and once the demodulation is correct, it indicates that the PDCCH for scheduling is monitored, and the successful demodulation means obtaining the physical resource for data transmission.

Step 450: the user equipment receives the downlink data transmitted by the base station according to the scheduling of the PDCCH.

The scheduling of the PDCCH is the downlink data scheduling mode obtained above.

The user equipment releases the C-RNTI allocated by the base station after the monitoring time length of the control channel exceeds. Similarly, the base station releases the C-RNTI after the monitoring time length of the control channel exceeds.

Correspondingly, the base station schedules the downlink data transmission to the user equipments through the control channel within the monitoring time length of the control channel indicated by the downlink data transmission scheduling information according to the physical resource position indicated by the downlink data transmission scheduling information; and The base station transmits the downlink data to the user equipments based on resources scheduled by the control channel.

It should be noted that the above example describes the implementation of carrying the RNTI for notifying the user equipment to perform control channel addressing in the paging message and using the RNTI to scramble the corresponding control channel in the process of scheduling the downlink data transmission to the user equipments through the control channel. But the embodiments of the invention are not limited thereto. Alternative, a specified RNTI can be agreed through a standard or pre-agreed by the base station and the user equipments, and in the process of scheduling the downlink data transmission to the user equipments through the control channel, the specified RNTI is used for scrambling the corresponding control channel. Correspondingly, at the user equipment side, in the process of monitoring the physical resource position of the control channel scheduling the downlink data transmission, the specified RNTI can also be used for descrambling the corresponding control channel.

Figure 6B:
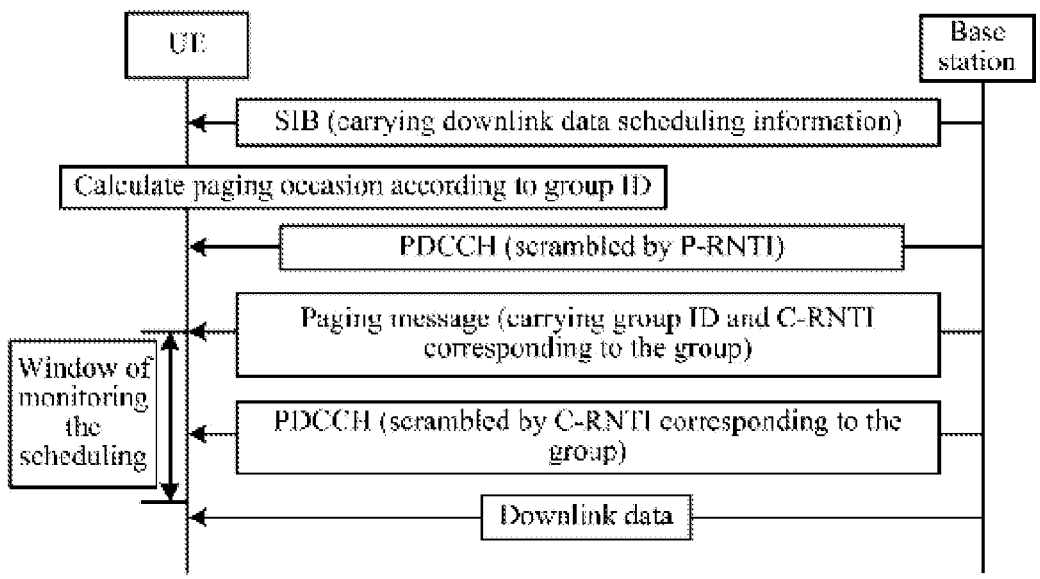
FIG. 6B is a schematic diagram of the second kind of group-based downlink data transmission for the LTE system according to an embodiment of the invention.

For the LTE system, the schematic diagram of the second kind of group-based downlink data transmission is as shown in FIG. 6B.

Figure 7A:
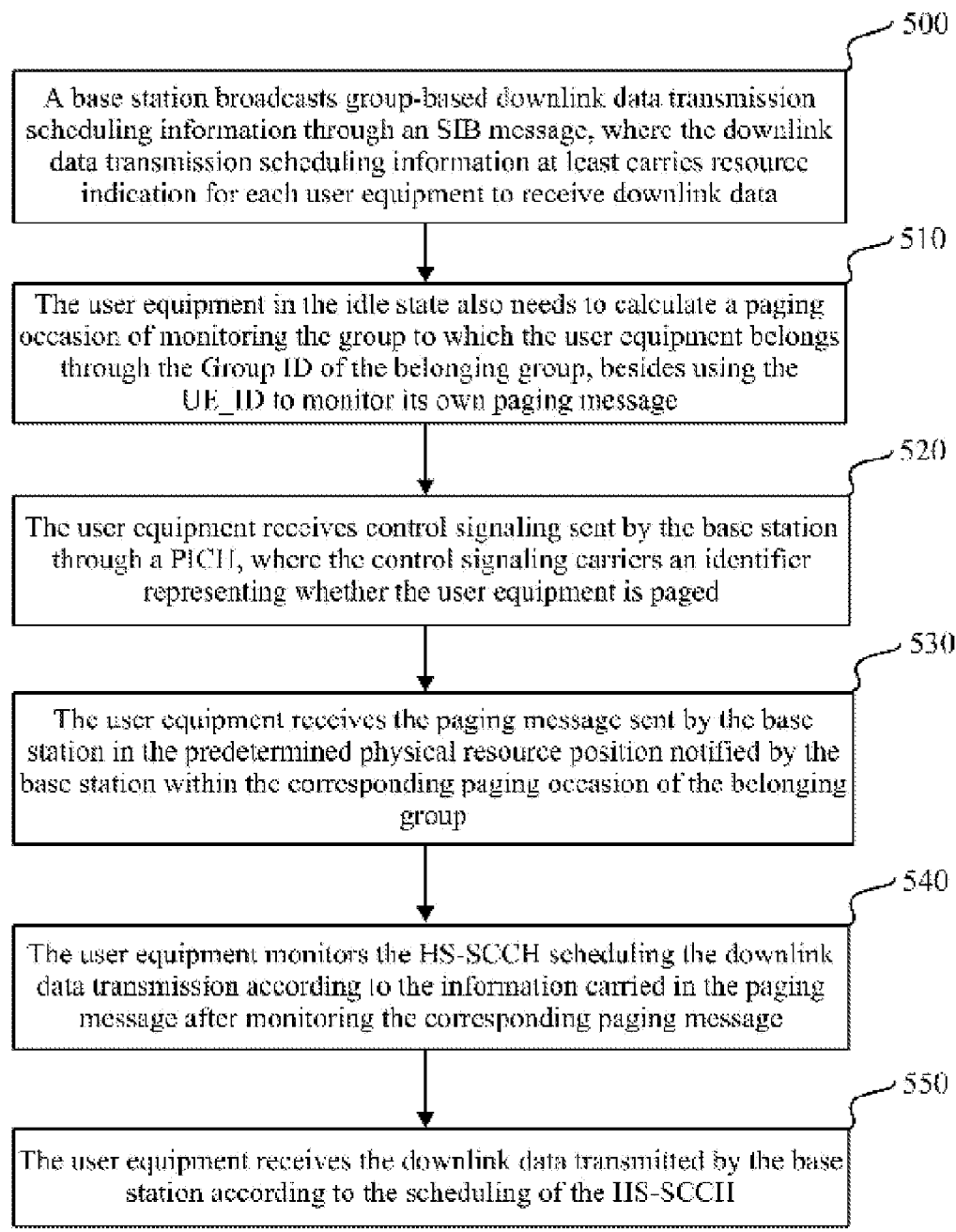
FIG. 7A is a detailed flow chart of a second kind of group-based downlink data transmission for the UMTS system according to an embodiment of the invention.

Based on the above system architecture, as shown in FIG. 7A, in an embodiment of the invention, the second one of the detailed flows of the group-based downlink data transmission as for the UMTS system is as follows:

Step 500: a base station broadcasts group-based downlink data transmission scheduling information through an SIB message, where the downlink data transmission scheduling information at least carries resource indication for each user equipment to receive downlink data.

Of course, the base station can send the group-based downlink data transmission scheduling information through an RRC message, and in the embodiment, only the SIB message in the broadcasting form is taken as an example.

The specific content of the downlink data transmission scheduling information can comprise: time length of monitoring a control channel by the user equipment in the group and a physical resource position of an HS-SCCH scheduling downlink data transmission. Further, the specific content can also comprise subframe offset of receiving the downlink data transmitted by the base station.

In an embodiment of the invention, the specific form of the system message can be as shown in Table 3:

TABLE 3

| Name of information unit/group | Need | Multiple | Type and reference | Static description |
| --- | --- | --- | --- | --- |
| Size of receiving window | Required | | Integer (1 . . . 16) | Time length of detecting HS-SCCH by UE |
| PICH list related to group | Optional | 1 to maximum number of SCCPCHs | | PICH capable of independently configuring or monitoring cell level |
| PICH information associated with group | Required | | Paging channel information 10.3.6.49 | |
| HS-SCCH information associated with group | Optional | | | HS-SCCH capable of independently configuring or monitoring cell level |

Step 510: the user equipment in the idle state also needs to calculate a paging occasion of monitoring the group to which the user equipment belongs through the Group ID of the belonging group, besides using the UE_ID to monitor its own paging message.

The user equipment can calculate the position number SFN of the radio frame where paging occasion of the belonging group is located according to the formula VI and determine the specific subframe in the radio frame, in which the scheduling of the paging message by the base station is monitored, according to the formula VII.

The Group ID of the group to which the user equipment belongs is set in a card of the user equipment, where the card can be an SIM card or a USIM card, and the Group ID of each group is uniquely determined.

Step 520: the user equipment receives control signaling sent by the base station through a PICH, where the control signaling carriers an identifier representing whether the user equipment is paged.

Step 530: the user equipment receives the paging message sent by the base station in the predetermined physical resource position notified by the base station within the corresponding paging occasion of the belonging group.

In actual applications, the user equipment can periodically monitor the paging message in the predetermined physical resource position notified by the base station within the corresponding paging occasion of the belonging group, where the paging message not only can carry the Group ID of the group but also can carry the Group ID of the group to which the user equipment belongs and downlink data transmission indication (data-flag). Further, the paging message can also carry an H-RNTI for notifying the user equipment to perform control channel addressing.

In an embodiment of the invention, the specific form of the paging message is as shown in Table 4:

TABLE 4

| Name of information unit/group | Need | Multiple | Type and reference |
|---|---|---|---|
| Message type | Required | | Information type |
| User equipment information | | | |
| List of paging records | Optional | 1 to maximum paging number | |
| Paging records | Required | | Paging records 10.3.3.23 |
| List of paging groups | Optional | 1 to maximum number of groups | Taking into account of limited paging message transmission resources, a few Group IDs are carried |
| Group ID | Required | | |
| High speed downlink shared channel radio network temporary identifier | Required | | |
| Other information | | | |
| Broadcast control channel change information | Optional | | Broadcast control channel change information 10.3.8.1 |
| Seismic and sea wave information | Optional | | Seismic and sea wave information 10.3.8.4ea |

Step 540: the user equipment monitors the HS-SCCH scheduling the downlink data transmission according to the information carried in the paging message after monitoring the corresponding paging message.

In the process of scheduling the downlink data transmission to the user equipments through the control channel, the base station uses the H-RNTI carried in the paging message to scramble the HS-SCCH. When the user equipment monitors that the paging message carries the Group ID of its own belonging group or monitors that the paging message carries the Group ID of its own belonging group and downlink data transmission indication (data-flag), the user equipment can use the H-RNTI carried in the paging message to monitor the HS-SCCH scheduling the downlink data transmission and also use the H-RNTI to descramble the corresponding HS-SCCH according to the monitoring time length of the control channel notified via the SIB message at the next subframe (or the next subframe+offset subframe) after receiving the paging message, to thereby obtain a downlink data scheduling mode so as to receive the downlink data transmitted by the base station in the downlink data scheduling mode.

Step 550: the user equipment receives the downlink data transmitted by the base station according to the scheduling of the HS-SCCH.

The scheduling of the HS-SCCH is the downlink data scheduling mode described above.

The user equipment releases the H-RNTI allocated by the base station after the monitoring time length of the control channel exceeds. Similarly, the base station releases the H-RNTI after the monitoring time length of the control channel exceeds.

Figure 7B:
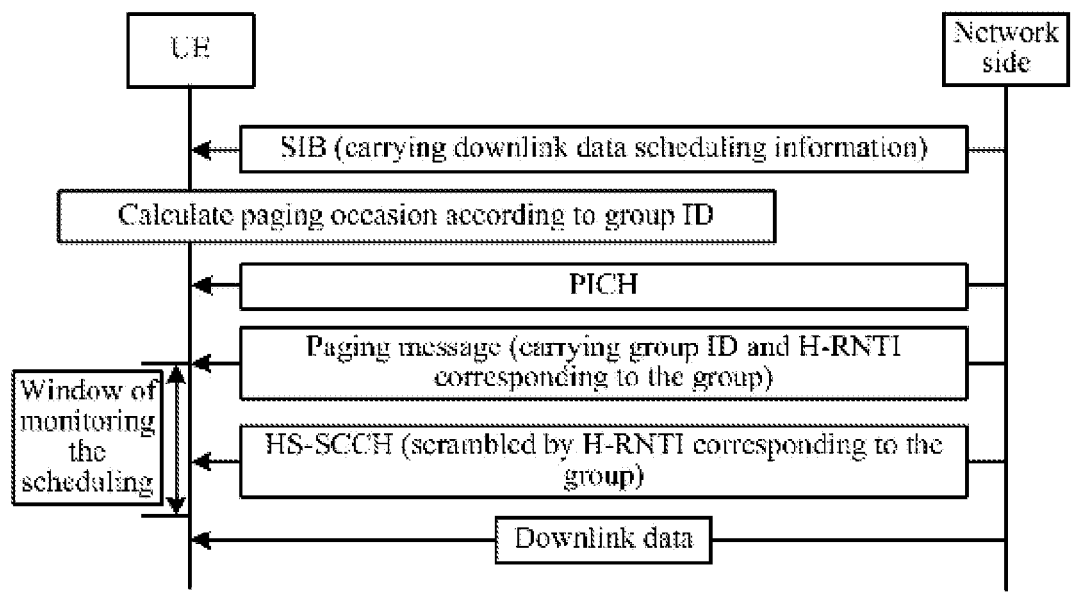
FIG. 7B is a schematic diagram of the second kind of group-based downlink data transmission for the UMTS system according to an embodiment of the invention.

For the UMTS system, the schematic diagram of the second kind of group-based downlink data transmission is as shown in FIG. 7B.

Based on the architecture of the network side as shown in FIG. 2, the working modes of various functional modules of the network side according to the embodiment of the invention will be described below, and the specific working modes can refer the description of the method embodiments and will not be discussed herein.

Based on the architecture of the network side as shown in FIG. 2, preferably, the first transmission unit 10 uses the system message or the RRC message to send the downlink data transmission scheduling information to the user equipment.

Based on the architecture of the network side as shown in FIG. 2, preferably, the downlink data transmission scheduling information sent by the first transmission unit 10 is group-based downlink data transmission scheduling information; and the occasion of sending the first message obtained by the obtaining unit 11 is the occasion obtained by calculation according to the Group ID corresponding to the group.

Based on any above device embodiment, preferably, when the second transmission unit 12 sends the first message to the user equipment at the occasion, if the first message is a paging message, the second transmission unit 12 makes the paging message carrying a Group ID of a group to which the user equipment belongs or carrying the Group ID of the group to which the user equipment belongs and downlink data transmission indication, and if the first message is a control channel message, the second transmission unit 12 makes the control channel message carrying the Group ID of the group to which the user equipment belongs.

Based on the architecture of the network side as shown in FIG. 2, preferably, the third transmission unit 13 transmits the downlink data to the user equipment according to the downlink data transmission scheduling information as follows:

the third transmission unit 13 transmits the downlink data to the user equipment according to downlink data transmission time length, a position of a starting subframe bearing downlink data transmission and downlink data transmission intervals indicated in the downlink data transmission scheduling information.

Based on the architecture of the network side as shown in FIG. 2, preferably, the third transmission unit 13 transmits the downlink data to the user equipment according to the downlink data transmission scheduling information as follows:

the third transmission unit 13 schedules the downlink data transmission to the user equipment through a control channel according to a physical resource position indicated by the downlink data transmission scheduling information within monitoring time length of the control channel indicated by the downlink data transmission scheduling information; and transmits the downlink data to the user equipment based on resources scheduled by the control channel.

Further, when the second transmission unit 12 makes the first message carrying a Radio Network Temporary Identifier (RNTI) for notifying the user equipment to perform control channel addressing, the second transmission unit 12 can use the RNTI to scramble the corresponding control channel in the process of scheduling the downlink data transmission to the user equipment through the control channel.

Further, the third transmission unit 13 can use a specified RNTI to scramble the corresponding control channel in the process of scheduling the downlink data transmission to the user equipment through the control channel.

Based on the architecture of the network side as shown in FIG. 2, preferably, the downlink data transmission scheduling information is group-based downlink data transmission scheduling information, and the occasion of sending the first message is an occasion obtained by calculation according to a user equipment identifier of the user equipment.

Based on any above device embodiment, preferably, when the second transmission unit 12 sends the first message to the user equipment at the occasion, if the first message is a paging message, the second transmission unit 12 makes the paging message carrying the user equipment identifier of the user equipment and downlink data transmission indication, and if the first message is a control channel message, the second transmission unit 12 makes the control channel message carrying the user equipment identifier of the user equipment.

Based on the architecture of the network side as shown in FIG. 2, preferably, the third transmission unit 13 transmits the downlink data to the user equipment according to the downlink data transmission scheduling information as follows:

the third transmission unit 13 determines a time point of starting to send the data in a following formula, and transmits the downlink data to the user equipment according to downlink data transmission time length, a position of a starting subframe bearing the downlink data transmission and downlink data transmission intervals indicated in the downlink data transmission scheduling information at the time point determined in the following formula;

SFN mod $m=0$ where m is the time length, and the time length is an integer multiple of the paging cycle.

Based on the architecture of the device as shown in FIG. 3, the working modes of various functional modules of each user equipment according to the embodiment of the invention will be described below, and the specific working modes can refer the description of the method embodiments and will not be discussed herein.

Based on the architecture of the device as shown in FIG. 3, preferably, the first communication unit 20 uses the system message or the RRC message to receive the downlink data transmission scheduling information sent by the network side.

Based on the architecture of the device as shown in FIG. 3, preferably, the downlink data transmission scheduling information received by the first communication unit 20 is group-based downlink data transmission scheduling information; and the occasion of receiving the first message by the second communication unit 22 is an occasion obtained by calculation according to a Group ID corresponding to the group.

Based on any above embodiment as shown in FIG. 3, preferably, in the process that the second communication unit 22 receives the first message sent by the network side at the occasion, if the first message is a paging message, the second communication unit 22 monitors a Group ID of a local belonging group or the Group ID of the local belonging group and downlink data transmission indication in the paging message, and if the first message is a control channel message, the second communication unit 22 monitors the Group ID of the local belonging group in the control channel message.

Based on the architecture of the device as shown in FIG. 3, preferably, in the process that the second communication unit 22 receives the first message sent by the network side at the occasion, if a situation that the first message carries a local user equipment identifier UE_ID and a Group ID of a local belonging group is monitored, an RRC connection establishing process is triggered.

Based on the architecture of the device as shown in FIG. 3, preferably, the third communication unit 23 receives the downlink data transmitted by the network side according to the downlink data transmission scheduling information as follows:

the third communication unit 23 receives the downlink data transmitted by the network side according to downlink data transmission time length, a position of a starting subframe bearing downlink data transmission and downlink data transmission intervals indicated in the downlink data transmission scheduling information starting from a next subframe after receiving the first message.

Based on the architecture of the device as shown in FIG. 3, preferably, the third communication unit 23 receives the downlink data transmitted by the network side according to the downlink data transmission scheduling information as follows:

the third communication unit 23 monitors a physical resource position of a control channel scheduling the downlink data transmission according to monitoring time length of the control channel indicated in the downlink data transmission scheduling information starting from a next subframe after receiving the first message; and receives the downlink data transmitted by the network side according to control channel signaling when receiving the control channel signaling sent by the network side at the physical resource position.

Further, when the second communication unit 22 makes the first message further carrying a radio network temporary identifier (RNTI) for control channel addressing, in the process of monitoring the physical resource position of the control channel scheduling the downlink data transmission, the third communication unit 23 is further configured to use the RNTI to descramble the corresponding control channel.

Preferably, the downlink data transmission scheduling information is downlink data transmission scheduling information based on a group, and the occasion of receiving the first message is an occasion obtained by calculation according to its own user equipment identifier.

Preferably, in the process that the second communication unit 22 receives the first message sent by the network side at the occasion, if the first message is a paging message, the second communication unit 22 monitors its own user equipment identifier and downlink data transmission indication in the paging message, and if the first message is a control channel message, the second communication unit 22 monitors its own user equipment identifier in the control channel message.

Preferably, the third communication unit 23 receives the downlink data transmitted by the network side according to the downlink data transmission scheduling information as follows:

the third communication unit 23 determines a time point of starting to receive the data in a following formula, and receives the downlink data transmitted by the network side according to downlink data transmission time length, a position of a starting subframe bearing the downlink data transmission and downlink data transmission intervals indicated in the downlink data transmission scheduling information at the time point determined in the following formula;

$$SFN \bmod m = 0$$

where m is the time length, and the time length is an integer multiple of the paging cycle.

In conclusion, in the embodiments of the invention, the user equipments belonging to a same user or distributed relatively densely in a regional range are combined into a group, and each group is uniquely identified with one Group ID. The user equipment in the idle state still monitors a first message, where the first message may be a paging message or a control channel message. Besides monitoring the paging message sent for the user equipment, the user equipment also needs to use the Group ID of the belonging group to monitor the first message sent for the group to which the user equipment belongs. Taking the paging message as an example, when the base station transmits the downlink data to the user equipments in a certain group, the base station pages the group of the user equipments at the paging occasion of the group, where the paging message carries the Group ID of the group to notify all the user equipments in the group. The user equipment receiving the paging message can receive the downlink data in the fixed physical resource position within the fixed time length (i.e., the time window), thereby realizing the effects of reducing the waste of the network resources and improving the utilization rate of the network resources when the base station transmits the data to a certain group of user equipments in M2M communication.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. A method for downlink data transmission, comprising:
    sending downlink data transmission scheduling information to a user equipment;
    obtaining a corresponding occasion of sending a first message, wherein the first message is used for instructing the user equipment to receive downlink data;
    sending the first message to the user equipment at the occasion; and
    transmitting the downlink data to the user equipment according to the downlink data transmission scheduling information;
    wherein transmitting the downlink data to the user equipment according to the downlink data transmission scheduling information comprises:
        transmitting the downlink data to the user equipment according to downlink data transmission time length, a position of a starting subframe bearing downlink data transmission and downlink data transmission intervals indicated in the downlink data transmission scheduling information; or
    wherein transmitting the downlink data to the user equipment according to the downlink data transmission scheduling information comprises:
        scheduling the downlink data transmission to the user equipment through a control channel according to a physical resource position indicated by the downlink data transmission scheduling information within monitoring time length of the control channel indicated by the downlink data transmission scheduling information, and transmitting the downlink data to the user equipment based on resources scheduled by the control channel; or wherein transmitting the downlink data to the user equipment according to the downlink data transmission scheduling information comprises:

determining a time point of starting to send the data in a following formula, and transmitting the downlink data to the user equipment according to downlink data transmission time length, a position of a starting subframe bearing the downlink data transmission and downlink data transmission intervals indicated in the downlink data transmission scheduling information at the time point determined in the following formula:

$$SFN \bmod m = 0$$

wherein m is the time length, and the time length is an integer multiple of a paging cycle.

2. The method according to claim 1, wherein a system message or a Radio Resource Control, RRC, message is used for sending the downlink data transmission scheduling information to the user equipment.

3. The method according to claim 1, wherein when the first message is sent to the user equipment at the occasion, if the first message is a paging message, the paging message carries a Group ID of a group to which the user equipment belongs or carries the Group ID of the group to which the user equipment belongs and downlink data transmission indication, and if the first message is a control channel message, the control channel message carries the Group ID of the group to which the user equipment belongs.

4. The method according to claim 1, wherein when the first message carries a Radio Network Temporary Identifier, RNTI, for notifying the user equipment to perform control channel addressing, the RNTI is used for scrambling the corresponding control channel in the process of scheduling the downlink data transmission to the user equipment through the control channel; or wherein a specified RNTI is used for scrambling the corresponding control channel in the process of scheduling the downlink data transmission to the user equipment through the control channel.

5. The method according to claim 1, wherein when the first message is sent to the user equipment at the occasion, if the first message is a paging message, the paging message carries the user equipment identifier of the user equipment and downlink data transmission indication, and if the first message is a control channel message, the control channel message carries the user equipment identifier of the user equipment.

6. The method according to claim 1, wherein the downlink data transmission scheduling information is downlink data transmission scheduling information based on a group, and the occasion of sending the first message is an occasion obtained by calculation according to a Group ID corresponding to the group.

7. The method according to claim 1, wherein the downlink data transmission scheduling information is downlink data transmission scheduling information based on a group, and the occasion of sending the first message is an occasion obtained by calculation according to a user equipment identifier of the user equipment.

8. A method for downlink data transmission, comprising:

receiving downlink data transmission scheduling information sent by a network side;

obtaining a corresponding occasion of receiving a first message, wherein the first message is used for instructing a user equipment side to receive downlink data;

receiving the first message sent by the network side at the occasion; and receiving the downlink data transmitted by the network side according to the downlink data transmission scheduling information;

wherein receiving the downlink data transmitted by the network side according to the downlink data transmission scheduling information comprises:

receiving the downlink data transmitted by the network side according to downlink data transmission time length, a position of a starting subframe bearing downlink data transmission and downlink data transmission intervals indicated in the downlink data transmission scheduling information starting from a next subframe after receiving the first message; or wherein receiving the downlink data transmitted by the network side according to the downlink data transmission scheduling information comprises:

monitoring a physical resource position of a control channel scheduling the downlink data transmission according to monitoring time length of the control channel indicated in the downlink data transmission scheduling information starting from a next subframe after receiving the first message, and receiving the downlink data transmitted by the network side according to control channel signaling when receiving the control channel signaling sent by the network side at the physical resource position; or wherein receiving the downlink data transmitted by the network side according to the downlink data transmission scheduling information comprises:

determining a time point of starting to receive the data in a following formula, and receiving the downlink data transmitted by the network side according to downlink data transmission time length, a position of a starting subframe bearing the downlink data transmission and downlink data transmission intervals indicated in the downlink data transmission scheduling information at the time point determined in the following formula:

$$SFN \bmod m = 0$$

wherein m is the time length, and the time length is an integer multiple of a paging cycle.

9. The method according to claim 8, wherein a system message or a Radio Resource Control, RRC, message is used for receiving the downlink data transmission scheduling information sent by the network side.

10. The method according to claim 8, wherein in the process of receiving the first message sent by the network side at the occasion, if the first message is a paging message, a Group ID of a local belonging group or the Group ID of the local belonging group and downlink data transmission indication is/are monitored in the paging message, and if the first message is a control channel message, the Group ID of the local belonging group is monitored in the control channel message.

11. The method according to claim 8, wherein in the process of receiving the first message sent by the network side at the occasion, if a situation that the first message carries a local user equipment identifier UE_ID and a Group ID of a local belonging group is monitored, an RRC connection establishing process is triggered.

12. The method according to claim 8, wherein when the first message further carries a radio network temporary identifier, RNTI, for control channel addressing, in the process of monitoring the physical resource position of the control channel scheduling the downlink data transmission, the method further comprises: using the RNTI to descramble the corresponding control channel; or wherein in the process of monitoring the physical resource position of the control channel scheduling the downlink data transmission, the method further comprises: using a specified RNTI to descramble the corresponding control channel.

13. The method according to claim 8, wherein in the process of receiving the first message sent by the network side at the occasion, if the first message is a paging message, its own user equipment identifier and downlink data transmission indication are monitored in the paging message, and if the first message is a control channel message, its own user equipment identifier is monitored in the control channel message.

14. The method according to claim 8, wherein the downlink data transmission scheduling information is downlink data transmission scheduling information based on a group; and the occasion of receiving the first message is an occasion obtained by calculation according to a Group ID corresponding to the group.

15. The method according to claim 8, wherein the downlink data transmission scheduling information is downlink data transmission scheduling information based on a group, and the occasion of receiving the first message is an occasion obtained by calculation according to its own user equipment identifier.

* * * * *